(12) United States Patent
Kawaba et al.

(10) Patent No.: US 9,720,600 B2
(45) Date of Patent: Aug. 1, 2017

(54) APPARATUS AND METHOD FOR TRANSFERRING DATA BETWEEN STORAGES HAVING DIFFERENT ACCESS SPEEDS

(71) Applicant: FUJITSU LIMITED, Kawasaki-shi, Kanagawa (JP)

(72) Inventors: Motoyuki Kawaba, Kawasaki (JP); Kazuichi Oe, Yokohama (JP); Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/278,487

(22) Filed: May 15, 2014

(65) Prior Publication Data

US 2014/0351504 A1    Nov. 27, 2014

(30) Foreign Application Priority Data

May 23, 2013    (JP) .................................. 2013-109328

(51) Int. Cl.
*G06F 3/06* (2006.01)
(52) U.S. Cl.
CPC .......... *G06F 3/0611* (2013.01); *G06F 3/0616* (2013.01); *G06F 3/0659* (2013.01); *G06F 3/0685* (2013.01)
(58) Field of Classification Search
CPC .. G06F 12/0866; G06F 3/061; G06F 12/0868; G06F 3/0659; G06F 3/0611; G06F 3/0685; G06F 3/0616; G06F 3/0665
USPC .......................... 711/113, 154, 163, 165, 167
See application file for complete search history.

(56) References Cited

U.S. PATENT DOCUMENTS

| | | | |
|---|---|---|---|
| 6,349,358 | B1 | 2/2002 | Kuwata |
| 2003/0140207 | A1 | 7/2003 | Nagase et al. |
| 2010/0095070 | A1 | 4/2010 | Okawara et al. |
| 2011/0302365 | A1* | 12/2011 | Heo .................... G06F 12/0866 711/104 |

(Continued)

FOREIGN PATENT DOCUMENTS

| | | |
|---|---|---|
| JP | 4-259048 | 9/1992 |
| JP | 2000-76017 | 3/2000 |
| JP | 2002-182978 | 6/2002 |

(Continued)

OTHER PUBLICATIONS

Office Action issued by the Patent Office of Japan on Jan. 31, 2017 in corresponding Japanese patent application No. 2013-109328.

*Primary Examiner* — Jasmine Song
(74) *Attorney, Agent, or Firm* — Staas & Halsey LLP

(57) ABSTRACT

An apparatus is connected to a first storage and a second storage which is accessed at an access speed lower than an access speed of the first storage. The apparatus accesses each of blocks stored in the second storage, and counts, for each of the blocks, the number of accesses made for the each block. The apparatus determines, based on the number of accesses that has been counted for each of the blocks, a transfer target block that is a target which is to be transferred from the second storage to the first storage, and determines a transfer time at which transfer of the transfer target block is to be performed. The apparatus transfers the determined transfer target block to the first storage at the determined transfer time.

6 Claims, 5 Drawing Sheets

(56) References Cited

U.S. PATENT DOCUMENTS

2014/0047170 A1* 2/2014 Cohen ............... G06F 12/0246
711/103

FOREIGN PATENT DOCUMENTS

| JP | 2003-216460 | 7/2003 |
|----|-------------|--------|
| WO | 2008-155815 | 12/2008 |

* cited by examiner

IMAGE OF IMPLEMENTATION OF HIERARCHICAL STORAGE SYSTEM

APPARATUS AND METHOD FOR TRANSFERRING DATA BETWEEN STORAGES HAVING DIFFERENT ACCESS SPEEDS

CROSS-REFERENCE TO RELATED APPLICATION

This application is based upon and claims the benefit of priority of the prior Japanese Patent Application No. 2013-109328, filed on May 23, 2013, the entire contents of which are incorporated herein by reference.

FIELD

The embodiment discussed herein is related to apparatus and method for transferring data between storages having different access speeds.

BACKGROUND

In recent years, the amount of data that information processing apparatuses such as computers are caused to process has tended to increase more and more. Currently, in normal cases, information processing apparatuses are caused to process the amount of data that is larger than the amount of data processed in the related art. Accordingly, tiering of storages that makes it possible to make a high-speed access while the cost of storing data is being reduced is employed.

Regarding storages, typically, the cost of storing data per unit amount of data tends to increase as the access speed at which such a storage is accessed increases. Accordingly, in the case of tiering of storages that are accessed at different access speeds, all data or data regarding which it is assumed that the frequency of access to the data is comparatively low is stored in an inexpensive storage that is accessed at a low access speed (hereinafter, referred to as a "low-speed storage"). Data regarding which it is assumed that the frequency of access to the data is comparatively high is stored in an expensive storage that is accessed at a high access speed (hereinafter, referred to as a "high-speed storage"). Thus, the cost of storing data is reduced, and it is possible to make a high-speed access.

In the case of tiering of storages, data transfer is performed as needed basis between the low-speed storage and the high-speed storage. Data transfer between the storages is performed by an information processing apparatus (a data transfer control apparatus) that is capable of accessing both the low-speed storage and the high-speed storage between which data transfer is to be performed. The information processing apparatus performs, using a program for tiering of storages, data transfer between the storages. It is possible to classify data transfer between the storages broadly into data transfer for copying data stored in one of the storages into the other storage and data transfer for relocating data so that the data stored in one of the storages will be moved into the other storage.

As transfer units in which data is transferred between the storages, transfer units based on a logical unit number (LUN), or, based on, for example, a sub-LUN are used. More specifically, a transfer unit is, for example, several hundred GB in size. Here, data used as the transfer unit is referred to as a "block".

The capacity of the high-speed storage is lower than that of the low-speed storage. The number of storable blocks is limited. Thus, in reality, movement of a block whose frequency of access is low into the high-speed storage causes a ratio of blocks whose frequencies of access are high to blocks stored in the high-speed storage to be reduced. Furthermore, there is a possibility that a block whose frequency of access is higher will be removed from the high-speed storage. Accordingly, it is very significant to appropriately predict a block whose frequency of access is high.

In normal cases, removal of a block on the high-speed storage is performed when the high-speed storage has no region in which another block that is to be newly transferred from the low-speed storage is to be stored. A block that is selected as a target to be removed is, for example, a block for which a time period over which the block is not accessed is the longest.

FIG. 1 is a diagram illustrating an example of access patterns. The horizontal axis represents time, and the vertical axis represents an accessed logical address (written as "accessed logical address" in FIG. 1). Each circle illustrated in FIG. 1 represents an access that has been made in reality. A method for predicting a block whose frequency of access is high will be described with reference to FIG. 1.

It is possible to classify the access patterns broadly into a sequential access and a random access. The sequential access is an access pattern in which the value of the logical address that is to be accessed is changed along one direction from a small value of the logical address to a large value of the logical address or one direction from a large value of the logical address to a small value of the logical address, as indicated by an access group bordered using a frame 11 illustrated in FIG. 1. Here, examples of the sequential access include a pseudo sequential access that is an access pattern in which a stride, which is the amount of change in the value of the logical address specified by making a continuous access, is changed by a comparatively large amount. In contrast, the random access is an access pattern in which the value of the logical address that is to be accessed is changed on an irregular basis.

In the sequential access, the value of the logical address is changed along one direction as a whole. Thus, it is possible to expect that a block, which is along the one direction and adjacent to a block that is being accessed by making a sequential access, will also be accessed with high frequency. Accordingly, in the related art, determination of a block that is to be transferred onto the high-speed storage is performed by focusing on the sequential access.

As a method for detecting the sequential access that is a method in the related art, there is a method in which a block is divided into a plurality of regions, in which a change in a ratio of regions that have been accessed in reality to the plurality of regions is monitored, and in which, when the ratio increases or equal to or larger than a certain value, it is determined that a sequential access has been made. Moreover, there is a method in which a pseudo sequential access is detectable by providing a margin for the stride in the address of a block that is accessed.

In the case of determination of, by detecting the sequential access, a block that is to be transferred, determination of a block that is to be determined is performed by detecting the sequential access. In the related art, the information processing apparatus that performs data transfer between the storages determines a block, and transfers the determined block onto the high-speed storage.

Japanese Laid-open Patent Publications No. 2002-182978, No. 2000-76017, and No. 4-259048, and Domestic Re-publication of PCT International Publication for Patent Application No. 2008/155815 are examples of the related art.

SUMMARY

According to an aspect of the invention, an apparatus is connected to a first storage and a second storage which is accessed at an access speed lower than an access speed of the first storage. The apparatus accesses each of blocks stored in the second storage, and counts, for each of the blocks, the number of accesses made for the each block. The apparatus determines, based on the number of accesses that has been counted for each of the blocks, a transfer target block that is a target which is to be transferred from the second storage to the first storage, and determines a transfer time at which transfer of the transfer target block is to be performed. The apparatus transfers the determined transfer target block to the first storage at the determined transfer time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

As described above, the number of blocks storable in the high-speed storage is smaller than the number of blocks storable in the low-speed storage. Thus, in the case of transfer of a block onto the high-speed storage, in normal cases, it is desirable that a block on the high-speed storage be removed. However, there is a possibility that an access to the block which is to be removed will be made. Thus, it is also significant to perform transfer of a block onto the high-speed storage by a time at which an access to the block is predicted to start. The reason for this is that it is expected that the possibility that an access will be able to be made, on the high-speed storage, to the block to be removed because of transfer of a new block will increase more.

There is a possibility that a plurality of blocks which are to be transferred will be determined in a comparatively short time period. Each of the blocks has a comparatively large amount of data. Thus, a transfer time period taken to transfer the block is also comparatively long. If the transfer time period is taken into consideration, it is desirable that a block, for which a time period taken until the frequency of access to the block is expected to become high in reality is predicted to be shorter, be preferentially transferred. The reason for this is that it is expected that the number of times an access is made on the high-speed storage will increase more.

Accordingly, it is desirable that a timing at which transfer of a block is to be performed be also controlled.

Hereinafter, an embodiment will be described in detail with reference to the drawings.

Figure 2:
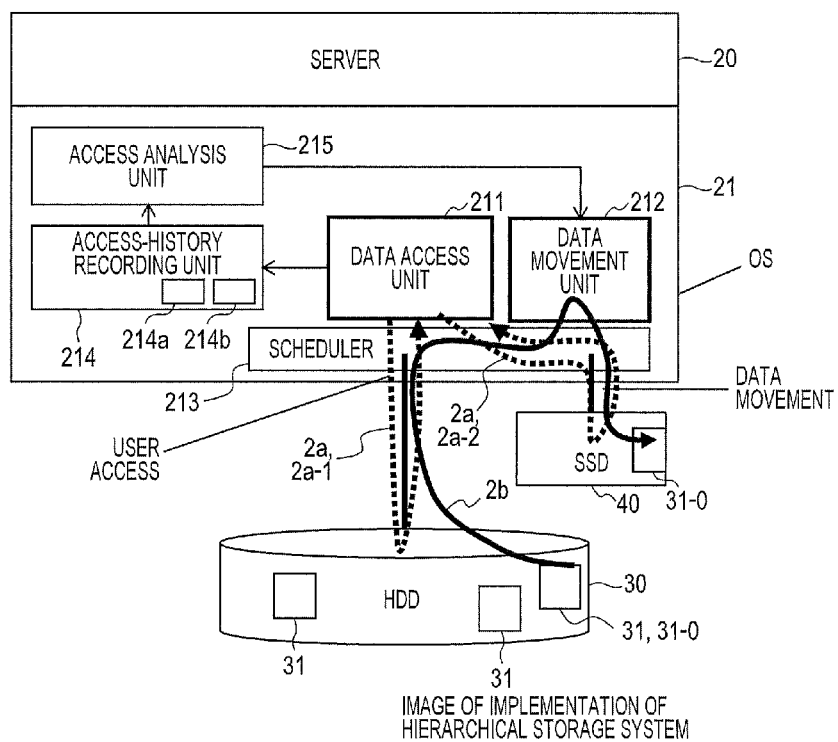
FIG. 2 is a diagram illustrating an example of a configuration of a hierarchical storage system structured using an information processing apparatus, according to an embodiment.

FIG. 2 is a diagram illustrating an example of a configuration of a hierarchical storage system structured using an information processing apparatus, according to an embodiment. As illustrated in FIG. 2, the hierarchical storage system includes a server 20 that is an information processing apparatus according to the present embodiment, a hard disk device (HDD) 30 that is a low-speed storage, and a solid state drive (SSD) 40 that is a high-speed storage.

In FIG. 2, for convenience of description, only one hard disk device 30 and only one SSD 40 are illustrated. However, in many cases, a plurality of hard disk devices 30 and a plurality of SSDs 40 are prepared. Tiering of storages is realized by employing the hard disk device 30 and the SSD 40 as two types of storages that are accessed at different access speeds. Storages that are employed are not limited to this combination. The number of levels of hierarchy is not limited to two. The number of levels of hierarchy may be equal to or larger than three.

In FIG. 2, only OS 21 is illustrated as a program that is executed on the server 20. In addition to a function as a normal basic software, here, a function of determining a block that is to be transferred between the hard disk device 30 and the SSD 40 and of realizing transfer of the determined block is incorporated into the OS 21. A data access unit 211, a data movement unit 212, a scheduler 213, an access-history recording unit 214, and an access analysis unit 215 that are illustrated in FIG. 2 are functions that are particularly related to transfer of a block having data used as the transfer unit. Reference numerals 31 and 31-0 illustrated in FIG. 2 denote blocks. The block 31-0 is a block that is relocated by being transferred from the hard disk device 30 onto the SSD 40.

The data access unit 211 is a function of issuing a user request, in response to a request from an application program (hereinafter, abbreviated to as an "application") that operates on the OS 21. Two broken-line arrows 2a (2a-1, 2a-2) illustrated in FIG. 2 indicate that a user request is transmitted to the hard disk device 30 or to the SSD 40, and that a response to transmission of the user request, is replied to the data access unit 211.

The data movement unit 212 performs a function of realizing data transfer between the hard disk device 30 and the SSD 40. A data transfer request for the data transfer is issued in units of blocks. The solid line arrow 2b illustrated in FIG. 2 indicates a transfer path in the case where data transfer is performed so that data 31-0 stored in the hard disk device 30 is stored in the SSD 40. Here, it is assumed that data transfer of a block 31 among the blocks 31 is performed for relocation of data.

Requests issued from the data access unit 211 and the data movement unit 212 are input to the scheduler 213. The scheduler 213 performs a function of selecting one of the input requests, and of transmitting the selected request to a storage to which the request is to be transmitted.

Different priorities are assigned to the request issued by the data access unit 211 and the request issued by the data movement unit 212. The high priority is assigned to the request issued by the data access unit 211. The low priority is assigned to the request issued by the data movement unit 212. In a situation in which the request issued by the data access unit 211 is present, the request issued by the data movement unit 212 is selected every time a fixed time period has elapsed.

The access-history recording unit 214 performs a function of recording, as a history, for each of the blocks 31, an access made to the block 31 due to a request issued by the data access unit 211. A access count table 214a and an address and time record table 214b are tables used to record the history, and are prepared for each of the blocks 31.

The access analysis unit 215 refers, for each of the blocks 31, to the address and time record table 214b, and determines, among the blocks 31, a block 31 that is to be transferred onto the SSD 40. When the access analysis unit 215 determines, among the blocks 31, a block 31 that is to be transferred onto the SSD 40, the access analysis unit 215 calculates a time at which transfer of the block 31 is to be completed, and provides an instruction for the data movement unit 212 so that transfer of the block 31 will be completed before the calculated time arrives.

Figure 3:
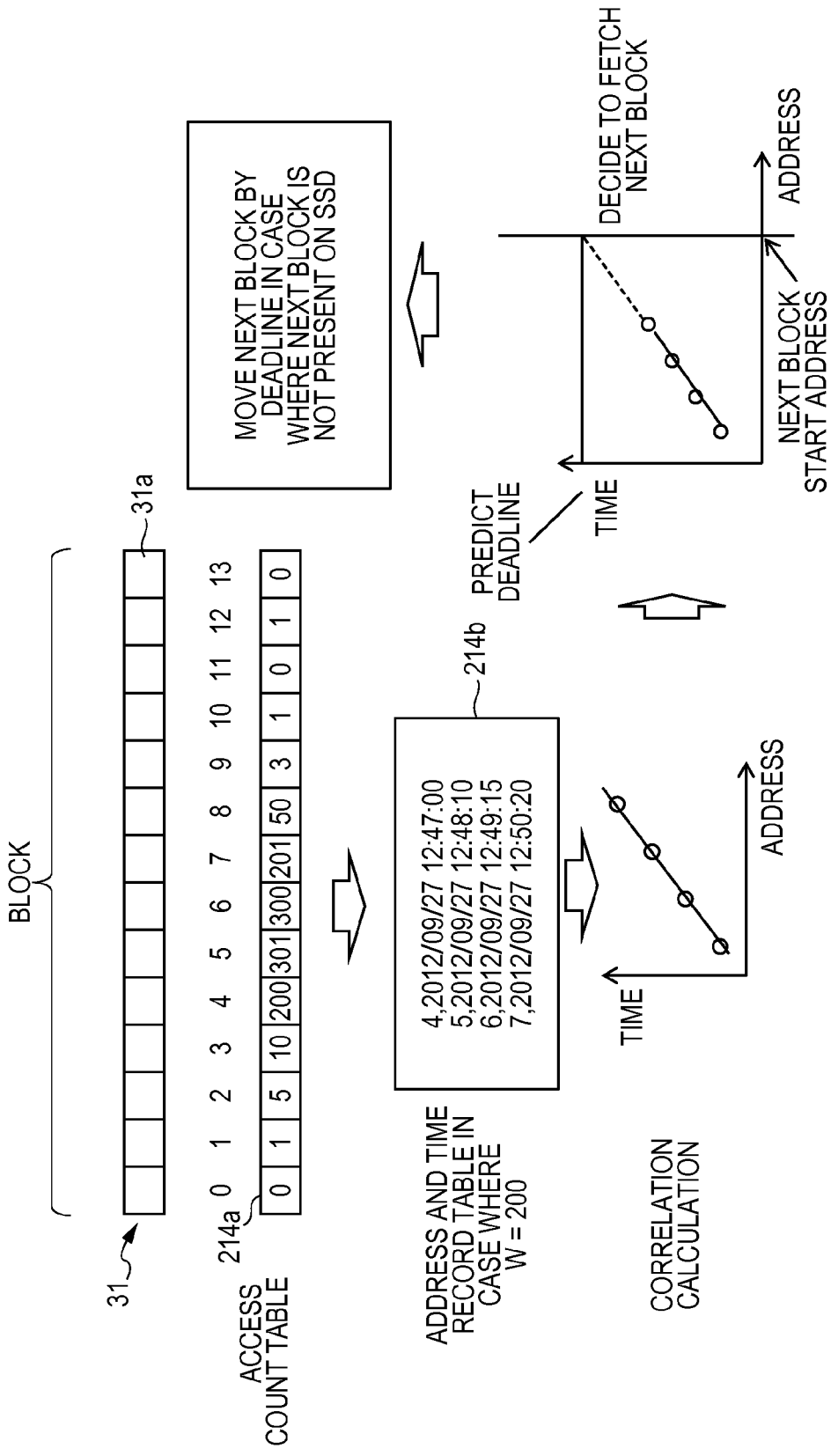
FIG. 3 is a diagram illustrating an example of a method for determining a block that is to be transferred and determining a time at which transfer of the block is to be performed, according to an embodiment.

FIG. 3 is a diagram illustrating an example of a method for determining a block that is to be transferred and determining a time at which transfer of the block is to be performed, according to an embodiment. Determination of a block that is to be transferred and a time at which transfer of the block is to be performed is realized by a coordination between the access-history recording unit 214 and the access analysis unit 215. Accordingly, next, with reference to FIG. 3, operations of the access-history recording unit 214 and the access analysis unit 215 will be specifically described.

In the embodiment, the number of accesses is counted, using an access count table described below, for each of a plurality of sub-blocks 31a included in each of the blocks 31. The access count table 214a provided for each of the blocks 31 is used to count the number of accesses made to each of the plurality of sub-blocks 31a. In the example illustrated in FIG. 3, each of the blocks 31 includes 14 sub-blocks 31a.

Address values denoted by 0 to 13 in FIG. 3 are address values that are typified by the corresponding sub-blocks 31a. Numbers such as "0", "1", "5", and "10" written in the access count table 214a indicate the numbers of accesses that are counted in reality in the corresponding sub-blocks 31a. Hereinafter, the address values that are typified by the sub-blocks 31a are referred to as "sub-block address values".

The address and time record table 214b is a table for recording information on, among the plurality of sub-blocks 31a, sub-blocks 31a each having the number of accesses that has become equal to or greater than a threshold W. Each of entries (records) records the sub-block address value of, among the plurality of sub-blocks 31a, a sub-block 31a having the number of accesses that has become equal to or greater than the threshold W, and records a time at which the number of accesses made to the sub-block 31a became equal to or greater than the threshold W. "4, 2012/09/27 12:47:00" that is illustrated in FIG. 3 indicates that the number of accesses made to the sub-block 31a that is denoted by 4 as a sub-block address value became equal to or greater than the threshold W (here, 200) on Sep. 27, 2012 at 12:47:00.

The number of accesses made to each of the sub-blocks 31a is counted in order to detect a sequential access. Examples of the sequential access include a pseudo sequential access. Here, referring to FIG. 4, a method for detecting a sequential access by counting the number of accesses made to each of the sub-blocks 31a will be specifically described.

Figure 1:
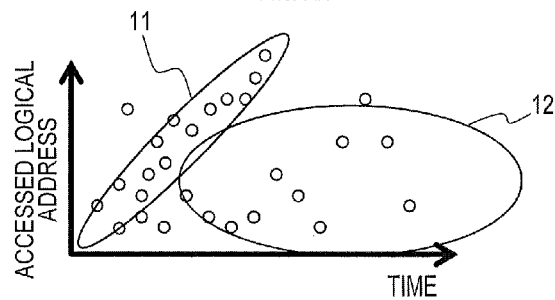
FIG. 1 is a diagram illustrating an example of access patterns.
Figure 4:
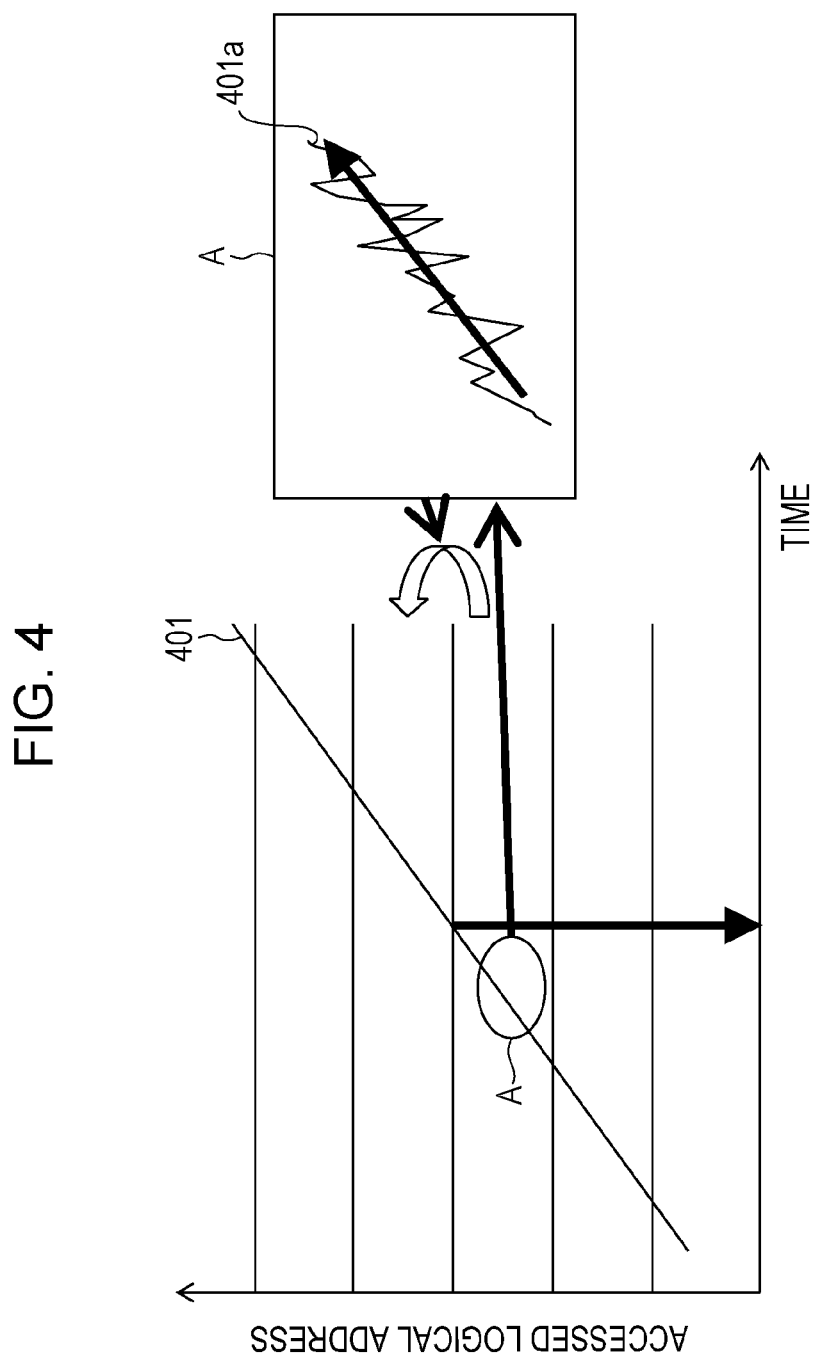
FIG. 4 is a schematic diagram illustrating an example of a method for detecting a sequential access by counting the number of accesses made to each sub-block, according to an embodiment.

In FIG. 4, the horizontal axis represents time, and the vertical axis represents a logical address that has been accessed (written as "accessed logical address" in FIG. 1). Individual lines that are drawn parallel to the horizontal axis represent ranges of the logical address in which data is included in the sub-blocks 31a. A straight line 401 represents an example of a change in the value of the logical address that is accessed in the case of a sequential access. FIG. 4 also illustrates an enlarged view in which a portion 401a of the straight line 401 that is present in a frame A is enlarged.

As indicated by the portion 401a in the frame A illustrated in FIG. 4, in the case of a pseudo sequential access, the stride is increased by a comparatively large amount. Thus, there is difficulty in detecting a pseudo sequential access. Furthermore, there is also a possibility that access using a sequential access and access using a random access are performed for logical addresses that are in a comparatively close range. In the case where accesses using different patterns are mixed together, the stride is easily increased by a large amount. Thus, detection of a sequential access (more particularly, a pseudo sequential access) becomes more difficult.

However, in the case of counting the number of accesses made to each of the sub-blocks 31a, when access using a sequential access is performed, among the sub-blocks 31a, a sub-block 31a whose counted number of accesses increases emerges along a direction in which the value of the logical address is changed. For example, it is assumed that, in FIG. 4, a sequential access is present along a direction in which the value of the logical address increases, and, currently, the sub-blocks 31a having values of the logical address are in the range represented by the frame A are mainly accessed. Under such an assumption, among the sub-blocks 31a, a first sub-block 31a is currently being continuously accessed, and, next, a second sub-block 31a that is adjacent to the first sub-block 31a along the direction in which the value of the logical address increases is to be continuously accessed.

Accordingly, when the number of accesses made to each of the sub-blocks 31a is counted, in the case of a sequential access, among the sub-blocks 31a, a sub-block 31a whose number of accesses has become equal to or greater than the threshold W emerges along the direction in which the value of the logical address is changed. The amount of change in the stride is neglected in units of the sub-blocks 31a. Accordingly, even a pseudo sequential access, for which the degree of irregularity is large and/or which is made while access using another pattern is being performed, is detectable with a high accuracy. Since it is unnecessary to take the amount of change in the stride into consideration, it is also possible to more easily detect a sequential access.

Among the sub-blocks 31a, emergence of a sub-block 31a whose number of accesses has become equal to or greater than the threshold W indicates a time period for which a continuous access made to the sub-blocks 31a is changed, that is, a speed per unit time at which the value of the logical address is changed. Accordingly, in the embodiment, the speed is used to determine a timing at which transfer of a sub-block 31a to be newly transferred is to be performed. Hereinafter, the speed is referred to as an "address change speed S".

The address change speed S is obtainable by, with reference to the address and time record table 214b, calculating the correlation between the sub-block address values and the times stored in the individual entries. For example, as illustrated in FIG. 3, supposing a graph (correlation diagram) in which the horizontal axis represents time and the vertical axis represents the accessed logical address, calculation of the correlation between the sub-block address values and the times corresponds to an operation of determining a straight line with which a distance between the straight line and individual points, which are determined using the sub-block address values and the times which are stored in individual entries, is minimized.

A sub-block address value indicating each of sub-blocks 31a is identification information indicating the position of the each sub-block 31a on a block 31. The reason why the sub-block address value is employed as identification information is that, even in the case where the numbers of sub-blocks 31a and the amounts of data stored in the individual sub-blocks 31a are different from each other for each of the blocks 31, the above-described operation of determining a line is made available. In the case where the numbers of sub-blocks 31a and the amounts of data stored in the individual sub-blocks 31a are the same for each of the blocks 31, information by which the position of each of the sub-blocks 31a on each of the blocks 31 is determinable may be used instated of the sub-block address value. Accordingly, it is possible to normalize the above-described operation of determining a line.

The address change speed S is not necessarily constant. Accordingly, in the embodiment, among the sub-blocks 31a, a predetermined number N, which is determined in advance, of sub-blocks 31a whose numbers of accesses have become equal to or greater than the threshold W are registered in the address and time record table 214b. Thus, even when the number of sub-blocks 31a that are registered has become the predetermined number N, the earliest registered sub-block 31a is removed. Calculation of the address change speed S is performed under a condition where, among the sub-blocks 31a, the predetermined number N of sub-blocks 31a are registered in the address and time record table 214b. The address and time record table 214b illustrated in FIG. 3 is a table in the case where the predetermined number N is four.

In the embodiment, a time at which the main access made to a block 31 among the blocks 31 is expected to finish is calculated, as a deadline, using the address change speed S. The time period remaining until the deadline is calculable by dividing, by the address change speed S, the remaining value of the logical address of the block 31 along a direction in which a sequential access is made. The remaining value of the logical address is a range of the logical address that is estimated to be accessed in the block 31 along a direction in which the value of the logical address is changed in the case of a sequential access. In the case of a sequential access in which the value of the logical address is changed along a direction in which the value of the logical address increases, the range of the logical address is a value obtained by subtracting, from the maximum value of the logical address on the block 31, the maximum value of the logical address of a sub-block 31a among the sub-blocks 31a whose numbers of accesses have become equal to or greater than the threshold W.

A "next block start address" illustrated in FIG. 3 indicates the minimum value of the logical address on the block 31 that is adjacent on the side on which the value of the logical address is large. The maximum value of the logical address on a block 31 that is adjacent to the block 31 on the side on which the value of the logical address is small is the value of the logical address that is adjacent to the minimum value of the logical address in the case of accessing the logical address. In the graph in which the next block start address is illustrated, a portion represented by the dotted line corresponds to the above-described range of the logical address.

Depending on the position of, on each of the blocks 31, among the sub-blocks 31a, a sub-block 31a whose number of accesses has become equal to or greater than the threshold W, it becomes practically impossible to register the predetermined number N of sub-blocks 31a in the address and time record table 214b. Accordingly, the number of sub-blocks 31a that are registered may be not necessarily limited to the predetermined number N. Registration of at least the predetermined number N of sub-blocks 31a may be not necessarily a condition under which calculation of the address change speed S is performed. Furthermore, when the address change speed S and a deadline have been calculated, the access count table 214a may be reset, that is, information recorded in all of the entries may be removed.

Each of the blocks 31 has a comparatively large amount of data. Thus, a comparatively long time period (movement cost) is taken to transfer the block 31. In the case of transferring a block 31, among the blocks 31, so that the block 31 will be relocated, in normal cases, the block 31 that is to be removed from the SSD 40 is written into the hard disk device 30. After that, a block 31 that is newly transferred is written in a region in which the block 31 is stored. Thus, a transfer time period C taken to transfer a block 31 so that the block 31 will be newly stored in the SSD 40 includes a time period taken to transfer (write) a block 31 from the SSD 40 to the hard disk device 30 and a time period taken to transfer (write) a block 31 from the hard disk device 30 to the SSD 40. The transfer time period C may be assumed to be almost constant. Accordingly, in the embodiment, transfer of a block 31 starts, basically, the transfer time period C before a calculated deadline so that transfer of the block 31 will finish by the calculated deadline.

In the case of scheduling a time at which, among the blocks 31, a block 31 is to be transferred onto the SSD 40 in this manner, it is possible to remain, over a longer time period, on the SSD 40, the block 31 that is to be removed from the SSD 40 by being transferred. If, among the blocks 31, a block 31 that is almost not accessed is a target to be removed, transfer of the block 31 that is to be transferred may be performed immediately. Accordingly, it is possible to make, higher, the probability that an access will be made to the block 31 on the SSD 40.

Furthermore, when, among the blocks 31, a plurality of blocks 31 that are to be transferred are determined in a comparatively short time period, priorities used for a case of transfer are set from the deadline. It is possible to perform transfer in accordance with the set priorities. It is possible to transfer each of the blocks 31 so that it is highly probable that an access will be made to each of the blocks 31 on the SSD 40, taking the deadline for each of the blocks 31 and the number of blocks 31 other than the block 31 that are to be transferred into consideration.

Accordingly, in any situation, it is possible to improve the efficiency of utilization of the SSD 40, that is, a probability that an access will be made to a block 31, among the blocks 31, more on the SSD 40.

Each of the blocks 31 has a comparatively large amount of data. The transfer time period C taken to transfer the block 31 is a comparatively long time period. The movement cost of moving the block 31 is not small. Accordingly, the above-described threshold W is set with consideration of the movement cost. For example, when a time period taken to access the hard disk device 30 is K seconds, a time period taken to access the SSD 40 is L seconds, and the number of sub-blocks is denoted by Bs, it is possible to obtain the threshold W from Equation given below.

$$W=C/((K-L)\cdot Bs) \quad (1)$$

Equation (1) mentioned above is an equation for a case where it is assumed that, for each of the sub-blocks 31a of an entire block 31 which is to be newly transferred, the number of accesses made to the each sub-block 31a will become at least the threshold W. The equation used to calculate the threshold W is not limited to Equation (1).

The access-history recording unit 214 illustrated in FIG. 2 manages, for each of the blocks 31, the access count table 214a and the address and time record table 214b, and performs desirable operations. The access analysis unit 215 performs, for each of the blocks 31, detection of a sequential access with reference to the address and time record table 214b. The access analysis unit 215 determines, in accordance with the result of detection, among the blocks 31, a block 31 that is to be transferred onto the SSD 40, and determines a deadline for the block 31. The access analysis unit 215 makes, from the determined deadline, a schedule for transferring, in reality, the block 31 that is to be transferred, and provides an instruction for the data movement unit 212. Accordingly, the access analysis unit 215 controls transfer of the block 31 so that the efficiency of utilization of the SSD 40 will become the maximum.

Figure 7:
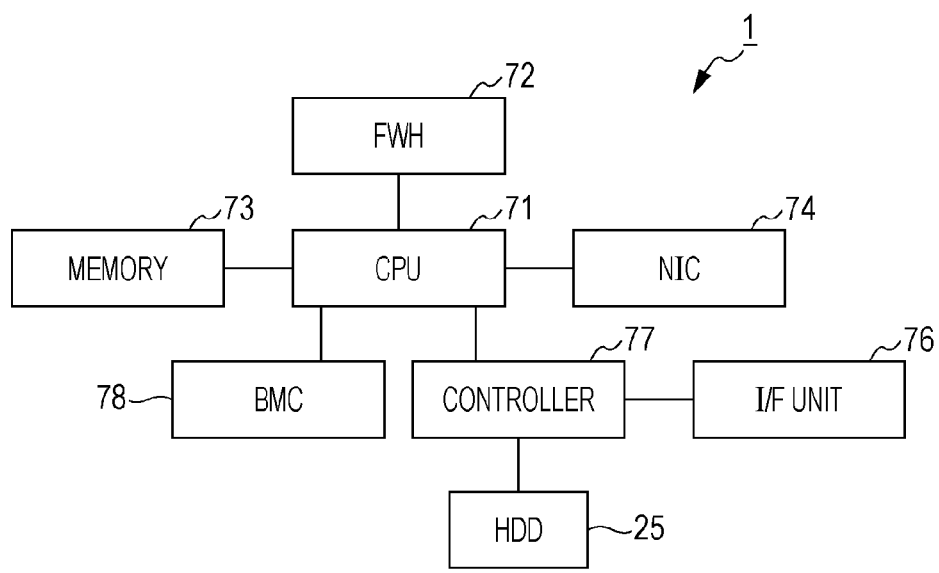
FIG. 7 is a diagram illustrating an example of a configuration of an information processing apparatus that is usable as a server, according to an embodiment.

The server 20 that executes the OS 21 which has the access-history recording unit 214 and the address and time record table 214b as functions has, for example, a hardware configuration illustrated in FIG. 7. Here, an example of a configuration of an information processing apparatus that is usable as the server 20 in the embodiment will be specifically described with reference to FIG. 7.

As illustrated in FIG. 7, this information processing apparatus includes a central processing unit (CPU) 71, a firmware hub (FWH) 72, a memory (memory module) 73, a network interface card (NIC) 74, a hard disk device (HD) 75, an interface (I/F) unit 76, a controller 77, and a baseboard management controller (BMC) 78. This configuration is an example of a configuration of an information processing apparatus that is usable as the server 20. The configuration of an information processing apparatus that is useable as the information processing apparatus according to the embodiment is not limited to the configuration illustrated in FIG. 7.

The FWH 72 is a memory in which a firmware is stored. This firmware is, by the CPU 71, loaded into the memory 73 and executed. In the hard disk device 75, the OS 21 and various types of programs (for example, an application program, hereinafter, abbreviated to as an "application") that operate on the OS 21 are stored. After activation of the firmware has been completed, the CPU 71 may load, into the memory 73, from the hard disk device 75 via the controller 77, the OS 21 and various types of programs that are to be executed, and of executing the OS 21 and the various types of programs. Communication via the NIC 74 is made possible by activating the firmware and the OS 21.

The I/F unit 76 is an access unit that performs communication with a plurality of storages. The hard disk device 30 and the SSD 40, which are illustrated in FIG. 2, are connectable to the I/F unit 76. Communication via the I/F unit 76 is made possible, for example, by activating the firmware.

The NIC 74 enables communication via a network, such as a local area network (LAN). The hard disk device 30 and the SSD 40, which are illustrated in FIG. 2, may be connected to a network that the NIC 74 is capable of communicating with.

The BMC 78 is a dedicated management device that is used to manage the information processing apparatus. The BMC 78, for example, turns on and off the CPU 71, and monitors an error that occurs in each element.

The OS 21 illustrated in FIG. 2 is loaded by the CPU 71 from the hard disk device 75 via the controller 77 into the memory 73, and executed. An access to the hard disk device 75 via the controller 77 is made by the CPU 71 after execution of the firmware loaded from the FWH 72 has started. Accordingly, all of functions provided for the OS 21 may be realized by, for example, the CPU 71, the FWH 72, the memory 73, the controller 77, and the hard disk device 75. The access count table 214a and the address and time record table 214b for each of the blocks 31 are stored in the memory 73 in normal cases.

A data transfer control apparatus according to the embodiment is realized by causing the CPU 71 to execute the OS 21. Accordingly, the server 20 that is an information processing apparatus according to the embodiment is a server on which the data transfer control apparatus according to the embodiment is mounted. The server 20 performs data transfer between the hard disk device 30 and the SSD 40 in accordance with a schedule made by the mounted data transfer control apparatus, thereby functioning as the information processing apparatus according to the embodiment.

Figure 5:
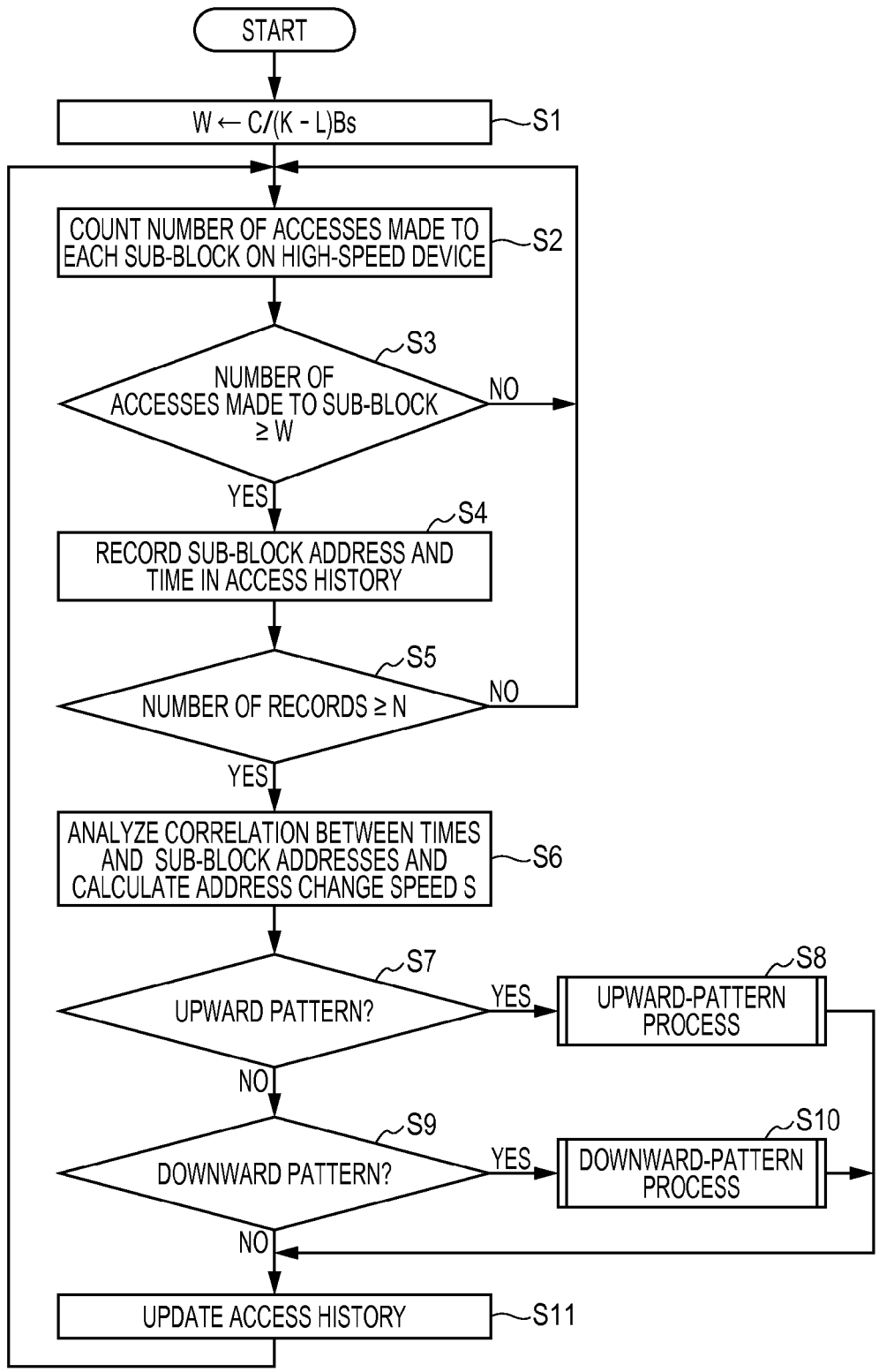
FIG. 5 is a diagram illustrating an example of an operational flowchart for a data transfer control process, according to an embodiment.

FIG. 5 is a diagram illustrating an example of an operational flowchart for a data transfer control process, according to an embodiment. The data transfer control process is realized by causing the CPU 71 to execute the OS 21. All portions of the access-history recording unit 214 and most portions of the access analysis unit 215 are realized by executing this data transfer control process. Next, the data transfer control process will be described in detail with reference to FIG. 5.

First, the CPU 71 calculates the threshold W using Equation (1) (S1). Operation S2 (following S1) and the subsequent operations are a series of processes that are performed when a user request issued in response to a request from an application is processed.

In S2, when the CPU 71 accesses one of the blocks 31 on the SSD 40 (written as "high-speed device" in FIG. 5), the CPU 71 counts up (increments) the number of accesses made to, among the sub-blocks 31a, a sub-block 31a that has been accessed in reality. Next, the CPU 71 determines whether or not the number of accesses after the CPU 71 has counted up the number of accesses has become equal to or greater than the threshold W (S3). When the number of accesses has become equal to or greater than the threshold W after the CPU 71 has counted up the number of accesses, the result of determination in S3 is YES, and the process proceeds to S4. When the number of accesses has not become equal to or greater than the threshold W after the CPU 71 has counted up the number of accesses, that is, when the number of accesses previously became equal to or greater than the threshold W or when the number of accesses is smaller than the threshold W after the CPU 71 has counted up the number of accesses, the result of determination in S3 is NO, and the process returns to S2. Accordingly, the CPU 71 prepares for the process for the next user request.

In S4, the CPU 71 records, in the address and time record table 214b (written as "access history" in FIG. 5) for the block 31 that has been accessed, the block number (written as "sub-block address" in FIG. 5) of, among the sub-blocks 31a, a sub-block 31a whose number of accesses has become equal to or larger than the threshold W and the current time. After that, the CPU 71 determines whether or not the number of sub-blocks 31*a* ("the number of records" illustrated in FIG. 5) for which the block numbers and the times are registered in the address and time record table 214*b* is equal to or greater than the predetermined number N (S5). When the number of sub-blocks 31*a* for which the block numbers and the times are registered is equal to or greater than the predetermined number N, the result of determination in S5 is YES, and the process proceeds to S6. When the number of sub-blocks 31*a* for which the block numbers and the times are registered is smaller than the predetermined number N, the result of determination in S5 is NO, and the process returns to S2.

In S6, the CPU 71 analyzes, with reference to the address and time record table 214*b*, the correlation between the times and the sub-block address values recorded in the individual entries, and calculates the address change speed S. Next, the CPU 71 determines whether or not a sequential address in an upward pattern in which the value of the logical address that is to be accessed is changed along a direction in which the value of the logical address increases emerges in the address and time record table 214*b* (S7). When the sub-block address values of the sub-blocks 31*a* whose numbers of accesses have become equal to or greater than the threshold W are sequentially registered in ascending order of the sub-block address values, the result of determination in S7 is YES, and the process proceeds to S8. When the sub-block address values of the sub-blocks 31*a* whose numbers of accesses have become equal to or greater than the threshold W are not sequentially registered in ascending order of the sub-block address values, the result of determination in S7 is NO, and the process proceeds to S9.

In S8, the CPU 71 performs an upward-pattern process of moving, onto the SSD 40, a block (hereinafter, referred to as a "high-order adjacent block") 31 that is adjacent to the block 31 that has been accessed, on the side on which the value of the logical address of the block 31 that has been accessed is large. After the CPU 71 has performed the upward-pattern process, the process proceeds to S11.

In contrast, in S9, the CPU 71 determines whether or not a sequential address in a downward pattern in which the value of the logical address that is to be accessed is changed along a direction in which the value of the logical address decreases emerges in the address and time record table 214*b*. When the sub-block address values of the sub-blocks 31*a* whose numbers of accesses have become equal to or greater than the threshold W are sequentially registered in descending order of the sub-block address values, the result of determination in S9 is YES, and the process proceeds to S10. When the sub-block address values of the sub-blocks 31*a* whose numbers of accesses have become equal to or greater than the threshold W are not sequentially registered in descending order of the sub-block address values, the result of determination in S9 is NO, and the process proceeds to S11. NO as the result of determination in S9 indicates that a sequential access does not emerge.

In S10, the CPU 71 performs a downward-pattern process of moving, onto the SSD 40, a block (hereinafter, referred to as a "low-order adjacent block") 31 that is adjacent to the block 31 that has been accessed, on the side on which the value of the logical address of the block 31 that has been accessed is small. After the CPU 71 has performed the downward-pattern process, the process proceeds to S11.

In S11, the CPU 71 clears the earliest registered entry among the entries in which the sub-block address values and the times are registered in the address and time record table 214*b*. After that, the process returns to S2.

Figure 6:
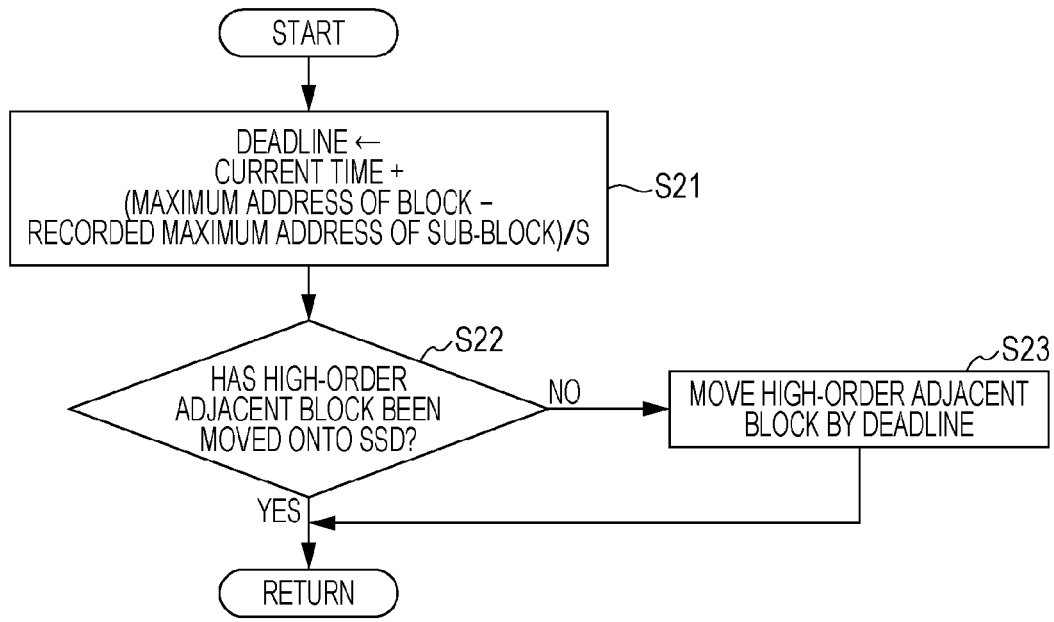
FIG. 6 is a diagram illustrating an example of an operational flowchart for an upward-pattern process, according to an embodiment.

FIG. 6 is a diagram illustrating an example of an operational flowchart for an upward-pattern process, according to an embodiment. Next, the upward-pattern process that is performed as S8 in the data transfer control process will be described in detail with reference to FIG. 6.

First, the CPU 71 calculates a deadline (S21). First, a value is obtained by subtracting, from the maximum address value of the block 31, the maximum address value among address values of the sub-blocks 31*a* whose numbers of accesses have become equal to or greater than the threshold W. Then, a time is obtained by dividing the obtained value by the address change speed S, and the deadline is obtained by adding the obtained time to the current time. After a deadline has been calculated, the process proceeds to S22.

In S22, the CPU 71 determines whether or not the high-order adjacent block 31 has already been moved onto the SSD 40. When the high-order adjacent block 31 is present on the SSD 40 already, the result of determination in S22 is YES, and, here, the upward-pattern process finishes. When the high-order adjacent block 31 is not present on the SSD 40, the result of determination in S22 is NO, and the process proceeds to S23.

In S23, the CPU 71 sets a schedule for transferring the high-order adjacent block 31 so that the high-order adjacent block 31 will be moved onto the SSD 40 by the deadline. After that, the upward-pattern process finishes.

A downward-pattern process that is is performed as S10 in the data transfer control process is a series of processes that has a flow which is basically the same as the flow of the above-described upward-pattern process. Accordingly, while reference numerals denoted in FIG. 6 are being used without being changed, the differences from the upward-pattern process will be described in detail.

In the downward-pattern process, calculation of a deadline in S21 is performed by: subtracting the minimum address value of the sub-block 31*a* from the minimum address value among address values of the sub-blocks 31*a* whose numbers of accesses have become equal to or greater than the threshold W; dividing the obtained value by the address change speed S to obtain a time; and adding the obtained time to the current time. Determination in S22 is performed in order to check whether or not the low-order adjacent block 31 has already been moved onto the SSD 40. In S23, a schedule is made so that the low-order adjacent block 31 will be moved onto the SSD 40 by the deadline.

In this manner, in the embodiment, every time a user request is processed, depending on the situation, among the blocks 31, a block 31 that is to be moved onto the SSD 40 is determined, and a schedule for moving the determined block 31 is made. Because the block 31 is moved in accordance with the schedule, the efficiency of utilization of the SSD 40 becomes the maximum.

Note that, in the embodiment, the server 20 is a server on which the date transfer control apparatus is mounted. However, the data transfer control apparatus may be mounted on an information processing apparatus that is different from the information processing apparatus which performs data transfer between the storages. In other words, the data transfer control apparatus may be not necessarily mounted on the server 20 when the data transfer control apparatus is capable of recognizing accesses made to the blocks 31 by the server 20. Accordingly, the data transfer control apparatus may be one information processing apparatus that configures a hierarchical storage system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus coupled to a first storage and a second storage, the second storage being accessed at an access speed lower than an access speed at which the first storage is accessed, the apparatus comprising:
    a processor configured to: access each of blocks stored in the second storage;
    for each of the blocks, count the number of accesses made for the each block and store, in a time record table, a time at which the number of access for each block becomes equal to or larger than a threshold;
    based on the number of accesses that has been counted for each of the blocks, determine a transfer target block that is a target which is to be transferred from the second storage to the first storage, and determine a transfer time at which transfer of the transfer target block is to be performed based on an address transfer speed of the transfer target block, the address transfer speed of the transfer target block being determined based on the time stored in the time record table; and
    transfer the determined transfer target block to the first storage at the determined transfer time.

2. The apparatus of claim 1, wherein
    the processor counts, as the number of accesses made for each of the blocks, the number of accesses made to each of a plurality of sub-blocks included in the block; and
    the processor determines, based on the number of accesses that has been counted for each of the plurality of sub-blocks, the transfer target block and the transfer time at which transfer of the transfer target block is to be performed.

3. A system comprising:
    a first storage;
    a second storage configured to be accessed at an access speed lower than an access speed at which the first storage is accessed; and
    an information processing apparatus including a processor configured to be coupled to the first and second storages, the processor being configured to:
    access each of blocks stored in the second storage,
    for each of the blocks, count the number of accesses made for the each block and store, in a time record table, a time at which the number of access for each block becomes equal to or larger than a threshold,
    based on the number of accesses that has been counted for each of the blocks, determine a transfer target block that is a target which is to be transferred from the second storage to the first storage, and determine a transfer time at which transfer of the transfer target block is to be performed based on an address transfer speed of the transfer target block, the address transfer speed of the transfer target block being determined based on the time stored in the time record table, and
    transfer the determined transfer target block to the first storage at the determined transfer time.

4. A method for controlling an information processing apparatus coupled to a first storage and a second storage, the second storage being accessed at an access speed lower than an access speed at which the first storage is accessed, the method being performed by a processor included in the information processing apparatus, the method comprising:
    accessing each of blocks stored in the second storage;
    counting for each of the blocks, the number of accesses made for the each block;
    storing, in a time record table, a time at which the number of access for each block becomes equal to or larger than a threshold;
    determining based on the number of accesses that has been counted for each of the blocks, a transfer target block that is a target which is to be transferred from the second storage to the first storage, and determining a transfer time at which transfer of the transfer target block is to be performed based on an address transfer speed of the transfer target block, the address transfer speed of the transfer target block being determined based on the time stored in the time record table; and
    transferring the determined transfer target block to the first storage at the determined transfer time.

5. A non-transitory, computer-readable recording medium having stored therein a program for causing a computer to execute a process, the computer being included in an information processing apparatus coupled to a first storage and a second storage, the second storage being accessed at an access speed lower than an access speed at which the first storage is accessed, the process comprising:
    accessing each of blocks stored in the second storage;
    counting, for each of the blocks, the number of accesses made for the each block;
    storing, in a time record table, a time at which the number of access for each block becomes equal to or larger than a threshold;
    determining, based on the number of accesses that has been counted for each of the blocks, a transfer target block that is a target which is to be transferred from the second storage to the first storage, and determining a transfer time at which transfer of the transfer target block is to be performed based on an address transfer speed of the transfer target block, the address transfer speed of the transfer target block being determined based on the time stored in the time record table; and
    transferring the determined transfer target block to the first storage at the determined transfer time.

6. A method for detecting a sequential access to a storage, the method being performed by an information processing apparatus accessible to the storage, the method comprising:
    counting an access count indicating a number of accesses made to each of a plurality of sub-blocks included in a data unit, the data unit being a unit for accessing the storage;
    selecting, from among the plurality of sub-blocks, first sub-blocks whose access counts have become equal to or greater than a threshold, and storing, in a time record table, an over-threshold time at which the access count of each of the first sub-blocks becomes equal to or greater than the threshold, in association with an address identifying a position of the each first sub-block;

determining, based on the time record table, an address-time correlation between the addresses for the first sub-blocks and the over-threshold times for the first sub-blocks; and detecting a sequential access when the determined address-time correlation indicates that the address for the first sub-blocks continues to change in one direction according as the over-threshold time for the first sub-blocks increases.

* * * * *